UNITED STATES PATENT OFFICE.

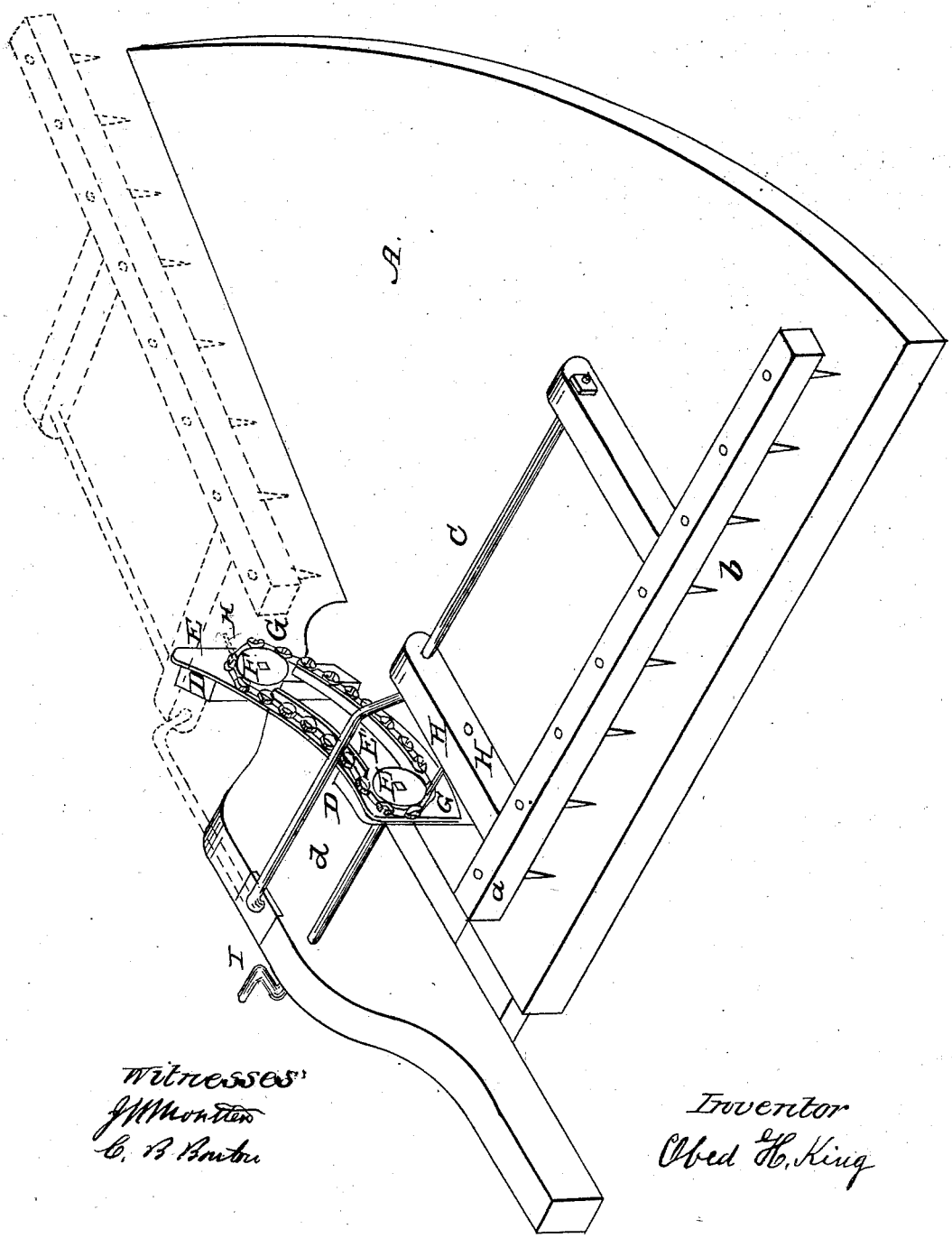

OBED H. KING, OF SALEM, IOWA.

IMPROVEMENT IN HARVESTERS.

Specification forming part of Letters Patent No. 24,941, dated August 2, 1859.

*To all whom it may concern:*

Be it known that I, O. H. KING, of Salem, in the county of Lee and State of Iowa, have invented a new and useful Improvement in Operating Rakes of Harvesters; and I do hereby declare that the following is a full, clear, and exact description of the same, reference being had to the accompanying drawing, forming a part of this specification, in which a perspective view of my invention is exhibited.

Before stating my invention, I deem it proper to say that I am aware that various devices for imparting to a rake substantially similar motions to those which are imparted to my rake, as it moves back and forth over the platform in the path of a horizontal circle, have been employed, and therefore that my invention simply consists in the peculiar arrangement and combination of devices shown with a circular platform for operating the rake and holding it to the platform while it is carrying off the grain and retaining it in an elevated position while it is returning to take a new quantity of grain.

To enable others skilled in the art to make and use my invention, I will proceed to describe its construction and operation.

A represents the platform, made circular, and shaped so as to discharge the grain at the side and out of the track of the horses, as usual in this character of self-raking harvesters.

B is the raker. It consists of a head, a, with teeth b, and with two brackets branching out at right angles. Through the brackets a bent rod, C, passes loosely and attaches to the top of the timber d of the side-draft frame, so as to be capable of swiveling or accommodating itself to the movement of the rake in the path of a circle. On this rod the rake rests or supports itself, and also turns up and down a short distance in the path of a vertical circle, so as to touch the platform while carrying off the grain and stand clear of it while returning to take a new quantity of grain from the platform. Just in front of the inner end of the rake two standards, D D, project up from the platform, as shown. Against the outer curved side of these standards a curved or elliptical metal guideway, E E', is arranged. At each end of this guideway a plain or grooved sprocket-wheel, F, is placed. Around these wheels F F an endless chain or belt, G, is arranged so as to revolve freely. The rake attaches to this chain by means of a pin, H, as shown.

I is the driving crank or shaft, which serves as the axis of one of the sprocket-wheels, and is actuated by the gearing of the harvester in any approved manner.

The operation will be readily understood. The machine being in motion, the rake is caused to descend upon the platform from the position shown in red to the position shown in black, by reason of the endless chain carrying the pin H over the upper flange, E, of the guideway from the rear to the front sprocket-wheel. At this stage the pin passes under the lower flange, E', of the guideway, and is held thereby as it passes along under the same to the rear sprocket-wheel, at which point the rake discharges the grain off the platform and is instantly elevated off the platform by reason of the pin H being caused to rise on top of the rear pulley, and consequently causing the rake to turn on the bent rod C and change its position, as illustrated in red. The rake in this position returns along the upper flange of the guideway, and consequently clears the platform until it arrives at the position shown in black, when it again turns on the bent rod and touches the platform.

What I claim as my invention, and desire to secure by Letters Patent, is—

The arrangement and combination of the circular platform A, rake B, rod C, guideway E E', endless chain or belt G, wheels F F, and pin H, all constructed, arranged, and operating together substantially as and for the purposes set forth.

OBED H. KING.

Witnesses:
WM. FANGMANN,
JOHN H. DART.